(12) United States Patent
Asaumi et al.

(10) Patent No.: US 11,078,794 B2
(45) Date of Patent: Aug. 3, 2021

(54) AIRFOIL STRUCTURE MANUFACTURING METHOD

(71) Applicant: IHI Corporation, Koto-ku (JP)

(72) Inventors: Norio Asaumi, Tokyo (JP); Nozomi Tanaka, Tokyo (JP); Junya Kouwa, Tokyo (JP); Kaoru Inoue, Tokyo (JP)

(73) Assignee: IHI Corporation, Koto-ku (JP)

( * ) Notice: Subject to any disclaimer, the term of this patent is extended or adjusted under 35 U.S.C. 154(b) by 298 days.

(21) Appl. No.: 16/043,931

(22) Filed: Jul. 24, 2018

(65) Prior Publication Data

US 2018/0328186 A1      Nov. 15, 2018

Related U.S. Application Data

(63) Continuation of application No. PCT/JP2017/003692, filed on Feb. 2, 2017.

(30) Foreign Application Priority Data

Feb. 16, 2016   (JP) ............................... JP2016-026807

(51) Int. Cl.
*F01D 5/14* (2006.01)
*F01D 5/20* (2006.01)
(Continued)

(52) U.S. Cl.
CPC .............. *F01D 5/147* (2013.01); *F01D 5/145* (2013.01); *F01D 5/20* (2013.01); *F01D 11/20* (2013.01);
(Continued)

(58) Field of Classification Search
CPC . F01D 5/145; F01D 5/147; F01D 5/20; F01D 11/20; F04D 29/023; F04D 29/324;
(Continued)

(56) References Cited

U.S. PATENT DOCUMENTS

2007/0247782 A1    10/2007   Nanataki et al.
2008/0067283 A1*   3/2008    Thomas .............. H05H 1/2406
                                                    244/1 N
(Continued)

FOREIGN PATENT DOCUMENTS

JP      2005-262108      9/2005
JP      2007-288063     11/2007
(Continued)

OTHER PUBLICATIONS

Extended European Search Report dated Aug. 28, 2019 in corresponding European Patent Application No. 17752975.7, 50 pages.
(Continued)

*Primary Examiner* — Erin E McGrath
(74) *Attorney, Agent, or Firm* — Oblon, McClelland, Maier & Neustadt, L.L.P.

(57) ABSTRACT

Disclosed is a method of manufacturing an airfoil structure. The airfoil structure includes a plurality of airfoils, a support for supporting the airfoils, and a case for covering the airfoils. Each airfoil includes an airfoil body, and an airflow generator for producing induced airflow by generating plasma. The method includes a process of forming the airflow generator that includes a first electrode forming step of forming a first electrode on the airfoil body, a dielectric layer forming step of forming a dielectric layer on the airfoil body by forming ceramic powder into a film to cover the first electrode through room temperature impact consolidation, and a second electrode forming step of forming a second electrode on a surface of the dielectric layer, such that the second electrode is electrically connected to the first electrode, and an alternating-current voltage is applied to the second electrode.

4 Claims, 9 Drawing Sheets

(51) Int. Cl.
   *F04D 29/68* (2006.01)
   *F01D 11/20* (2006.01)
   *F04D 29/32* (2006.01)
   *H05H 1/24* (2006.01)
   *F15D 1/00* (2006.01)
   *F04D 29/02* (2006.01)

(52) U.S. Cl.
   CPC ......... *F04D 29/023* (2013.01); *F04D 29/324* (2013.01); *F04D 29/687* (2013.01); *F15D 1/0075* (2013.01); *F15D 1/0085* (2013.01); *H05H 1/24* (2013.01); *H05H 1/2406* (2013.01); *F05D 2220/32* (2013.01); *F05D 2230/235* (2013.01); *F05D 2230/31* (2013.01); *F05D 2230/313* (2013.01); *F05D 2230/90* (2013.01); *F05D 2270/172* (2013.01); *F05D 2300/6033* (2013.01); *H05H 2001/2412* (2013.01); *H05H 2001/2418* (2013.01)

(58) Field of Classification Search
   CPC .... F04D 29/687; F15D 1/0075; F15D 1/0085; H05H 1/24; H05H 1/2406
   See application file for complete search history.

(56) References Cited

U.S. PATENT DOCUMENTS

| | | |
|---|---|---|
| 2008/0089775 A1 | 4/2008 | Lee et al. |
| 2008/0145210 A1 | 6/2008 | Lee et al. |
| 2008/0145233 A1* | 6/2008 | Lee ............... F01D 5/147 416/96 R |
| 2010/0183424 A1 | 7/2010 | Roy |
| 2010/0187366 A1 | 7/2010 | Gupta et al. |
| 2011/0198312 A1 | 8/2011 | Tanaka et al. |
| 2011/0236182 A1 | 9/2011 | Wiebe et al. |
| 2011/0253842 A1 | 10/2011 | Silkey et al. |
| 2012/0152198 A1 | 6/2012 | Kim et al. |
| 2012/0193483 A1* | 8/2012 | Essenhigh ........... B64C 23/005 244/205 |
| 2013/0145618 A1 | 6/2013 | Tanaka et al. |
| 2013/0306988 A1* | 11/2013 | Kub ................. H01L 21/02507 257/77 |

FOREIGN PATENT DOCUMENTS

| | | |
|---|---|---|
| JP | 2008-1354 | 1/2008 |
| JP | 2008-140584 | 6/2008 |
| JP | 2008-163940 | 7/2008 |
| JP | 2010-265826 | 11/2010 |
| JP | 2012-38587 | 2/2012 |
| JP | 2012-207667 | 10/2012 |
| JP | 5075476 | 11/2012 |
| JP | 2012-253025 | 12/2012 |
| JP | 5112371 | 1/2013 |
| JP | 2013-64352 | 4/2013 |
| JP | 2013-89446 | 5/2013 |
| JP | 2013-530486 | 7/2013 |
| JP | 5259528 | 8/2013 |
| JP | 2013-236995 | 11/2013 |
| JP | 2013-258137 | 12/2013 |
| JP | 2014-30822 | 2/2014 |
| JP | 5443808 | 3/2014 |
| JP | 5444398 | 3/2014 |
| JP | 5498384 | 5/2014 |
| JP | 5500997 | 5/2014 |
| JP | 2014-103094 | 6/2014 |
| WO | WO 2011/133260 A1 | 10/2011 |

OTHER PUBLICATIONS

International Search Report dated Mar. 7, 2017 in PCT/JP2017/003692, filed on Feb. 2, 2017 (with English Translation).
Written Opinion dated Mar. 7, 2017 in PCT/JP2017/003692, filed on Feb. 2, 2017.
Fukagawa, K. et al., "Plasma: Actuators Fundamentals and Research Trends," The Japan Society of Fluid Mechanics, Nagare 29, 2010, pp. 10 (with English Abstract).
Office Action dated Jun. 25, 2019 in Japanese Patent Application No. 2018-500028.

* cited by examiner

AIRFOIL STRUCTURE MANUFACTURING METHOD

CROSS REFERENCE TO RELATED APPLICATIONS

This application is a continuation application of International Application No. PCT/JP2017/003692, filed on Feb. 2, 2017, which claims priority to Japanese Patent Application No. 2016-026807, filed on Feb. 16, 2016, the entire contents of which are incorporated by references herein.

BACKGROUND

1. Field

The present disclosure relates to an airfoil structure manufacturing method, and particularly to a method of manufacturing an airfoil structure to be used in a jet engine.

2. Description of the Related Art

A jet engine includes a compressor, a turbine and the like. They are formed from an airfoil structure that includes a plurality of airfoils. For the purpose of enhancing the efficiency of the compressor, the turbine and the like, aerodynamic characteristics around each airfoil are improved by providing the airfoil surfaces in the airfoil structure with plasma actuators that are each formed by interposing a dielectric between a pair of electrodes, and causing the plasma actuators to produce induced airflow by dielectric barrier discharge. See Japanese Patent Application Publication No. 2008-140584 (Patent Literature 1).

SUMMARY

Meanwhile, since the airfoil structures in the compressor, the turbine and the like used in the jet engine are exposed to high temperature, the plasma actuators are each formed by interposing the dielectric, made from ceramic bulk, between the pair of electrodes. A complicated curved shape of each airfoil in the airfoil structure likely makes it difficult to shape the dielectric of hard ceramic bulk which is hardly deformed, and to form the dielectric on the airfoil surface of the airfoil.

An object of the present disclosure is to provide an airfoil structure manufacturing method that makes it possible to easily form a ceramic-made dielectric for producing induced airflow by dielectric barrier discharge on the airfoil surface of each airfoil and the like in an airfoil structure to be used in a jet engine.

An airfoil structure manufacturing method according to an embodiment of the present disclosure is a method of manufacturing an airfoil structure to be used in a jet engine. The airfoil structure includes a plurality of airfoils, a support for supporting the airfoils at their lower ends, and a case for covering upper ends of the airfoils. Each airfoil includes a airfoil body formed extending in a longitudinal direction of the airfoil, and an airflow generator, provided to the airfoil body, for producing induced airflow by generating plasma. The method includes a process of forming the airflow generator that includes a first electrode forming step of forming a first electrode on the airfoil body, a dielectric layer forming step of forming a dielectric layer on the airfoil body by forming ceramic powder into a film to cover the first electrode through room temperature impact consolidation, and a second electrode forming step of forming a second electrode on a surface of the dielectric layer in a way that exposes the second electrode to an outside, such that the second electrode is electrically connected to the first electrode, and an alternating-current voltage is applied to the second electrode.

The airfoil structure manufacturing method according to the embodiment of the present disclosure is as follows. In the first electrode forming step, the first electrode is formed on a leading edge-side part of an airfoil lateral surface of the airfoil body. In the dielectric layer forming step, the dielectric layer is formed on a leading edge-side part of the airfoil lateral surface of the airfoil body. In the second electrode forming step, the second electrode is formed on the surface of the dielectric layer, which is opposite from the airfoil body, in the way that exposes the second electrode to the outside.

The airfoil structure manufacturing method according to another embodiment of the present disclosure is as follows. In the first electrode forming step, the first electrode is formed on an airfoil lateral surface of the airfoil body, spanning from a trailing edge-side part of a negative pressure surface to a trailing edge-side part of a positive pressure surface via a leading edge. In the dielectric layer forming step, the dielectric layer is formed on all the airfoil lateral surface of the airfoil body. In the second electrode forming step, the second electrode is formed on the surface of the dielectric layer, which is opposite from the airfoil body, in the way that exposes the second electrode to the outside.

The airfoil structure manufacturing method according to another embodiment of the present disclosure is as follows. In the first electrode forming step, the first electrode is formed on an upper end surface of the airfoil body. In the dielectric layer forming step, the dielectric layer is formed on the upper end surface of the airfoil body. In the second electrode forming step, the second electrode is formed on a side surface of the dielectric layer in the way that exposes the second electrode to the outside.

The airfoil structure manufacturing method according to another embodiment of the present disclosure is as follows. In the first electrode forming step, the first electrode is formed on an upper end surface of the airfoil body. In the dielectric layer forming step, the dielectric layer is formed on the upper end surface of the airfoil body. In the second electrode forming step, the second electrode is formed on the surface of the dielectric layer, which is opposite from the airfoil body, in the way that exposes the second electrode to the outside.

The airfoil structure manufacturing method according to the embodiments of the disclosure is as follows. The process of forming the airflow generator further includes a third electrode forming step of forming a third electrode on the surface of the dielectric layer in a way that exposes the third electrode to the outside, such that the third electrode is away from the second electrode, the third electrode is electrically connected to the first electrode, and a direct-current voltage is applied to the third electrode.

An airfoil structure manufacturing method according to another embodiment of the present disclosure is a method of manufacturing an airfoil structure to be used in a jet engine. The airfoil structure includes a plurality of airfoils, a support for supporting the airfoils at their lower ends, and a case for covering upper ends of the airfoils. Each airfoil includes an airfoil body that is formed extending in a longitudinal direction of the airfoil. The case includes a case body that covers the upper ends of the airfoils. An airflow generator is provided to the airfoil body and the case body for producing induced airflow by generating plasma. The method includes a process of forming the airflow generator that includes a first electrode forming step of forming a first electrode on an upper end surface of the airfoil body, a dielectric layer forming step of forming a dielectric layer on the upper end surface of the airfoil body by forming ceramic powder into a film to cover the first electrode through room temperature impact consolidation, and a second electrode forming step of forming a second electrode on a surface of the case body, which faces the dielectric layer, in a way that exposes the second electrode to an outside, such that the second electrode is electrically connected to the first electrode, and an alternating-current voltage is applied to the second electrode.

The airfoil structure manufacturing method according to another embodiment of the present disclosure is as follows. The process of forming the airflow generator further includes a third electrode forming step of forming a third electrode on the surface of the case body, which faces the dielectric layer, in a way that exposes the third electrode to the outside, such that the third electrode is away from the second electrode, the third electrode is electrically connected to the first electrode, and a direct-current voltage is applied to the third electrode.

An airfoil structure manufacturing method according to another embodiment of the present disclosure is a method of manufacturing an airfoil structure to be used in a jet engine. The airfoil structure includes a plurality of airfoils, a support for supporting the airfoils at their lower ends, and a case for covering upper ends of the airfoils. Each airfoil includes an airfoil body that is formed extending in a longitudinal direction of the airfoil. The support includes a support body that supports the airfoils at their lower ends. An airflow generator is provided to the airfoil body and the support body for producing induced airflow by generating plasma. The method includes a process of forming the airflow generator that includes a first electrode forming step of forming a first electrode spanning from an airfoil lateral surface of the airfoil body to an airfoil-side part of a surface of the support body, a dielectric layer forming step of forming a dielectric layer spanning from the airfoil lateral surface of the airfoil body to the airfoil-side part of the surface of the support body, by forming ceramic powder into a film to cover the first electrode through room temperature impact consolidation, and a second electrode forming step of forming a second electrode on a surface of the dielectric layer, which is opposite from the airfoil body and the support body, in a way that exposes the second electrode to an outside, such that the second electrode is electrically connected to the first electrode, and an alternating-current voltage is applied to the second electrode.

The airfoil structure manufacturing method according to another embodiment of the present disclosure is as follows. The process of forming the airflow generator further includes a third electrode forming step of forming a third electrode on the surface of the dielectric layer, which is opposite from the airfoil body and the support body, in a way that exposes the third electrode to the outside, such that the third electrode is away from the second electrode, the third electrode is electrically connected to the first electrode, and a direct-current voltage is applied to the third electrode.

The airfoil structure manufacturing method according to the embodiments of the present disclosure is such that, in the dielectric layer forming step, the dielectric layer is formed using an aerosol deposition method.

Since the above-discussed configurations allow the dielectric layer to be formed on the airfoil body and the like by forming ceramic powder into a film through room temperature impact consolidation, the configurations make it possible to easily form the dielectric layer.

DESCRIPTION OF EMBODIMENTS

First Embodiment

Figure 1:
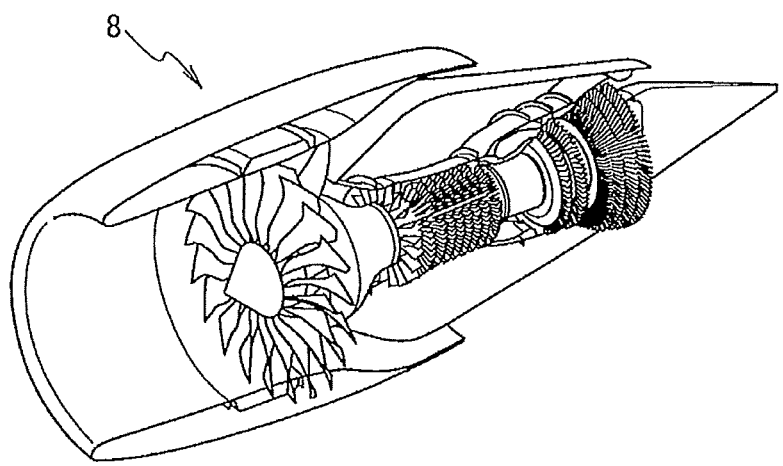
FIG. 1 is a diagram illustrating a configuration of a jet engine in a first embodiment of the present disclosure.

A first embodiment of the present disclosure will be described in detail using the drawings. To begin with, descriptions will be provided for a jet engine such as an aircraft turbofan engine. FIG. 1 is a diagram illustrating a configuration of a jet engine 8. The jet engine 8 includes a compressor and a turbine. The compressor, the turbine, and the like are each made from an airfoil structure including a plurality of airfoils.

Figure 2:
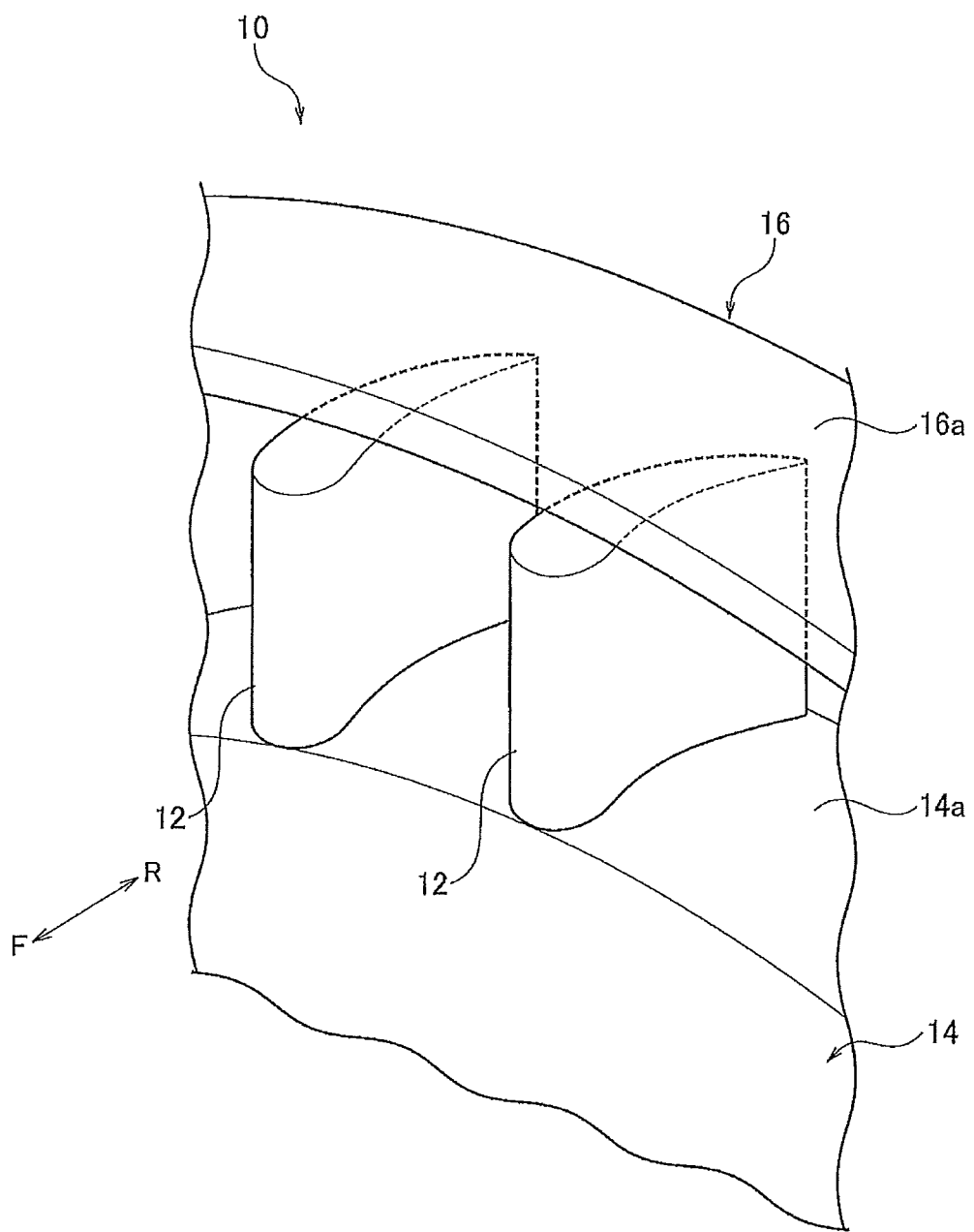
FIG. 2 is a diagram illustrating a configuration of an airfoil structure in the first embodiment of the present disclosure.

FIG. 2 is a diagram illustrating a configuration of the airfoil structure 10. Incidentally, in FIG. 2, reference signs F, R respectively represent the upstream and downstream sides of working fluid in the axial direction of the jet engine 8. The airfoil structure 10 includes a plurality of airfoils 12, a support 14 for supporting the airfoils 12 at their lower ends as the base ends, and a case 16 for covering the upper ends of the airfoils 12. The support 14 includes a support body 14a for supporting the airfoils 12 at the lower ends. The support 14 is formed, for example, from a rotatable disk or the like. The case 16 includes a case body 16a that covers the upper ends of the airfoils 12, is spaced away from the airfoils 12, and is formed in the shape of a cylinder or the like. The airfoils 12, the support 14 and the case 16 are each made from a metal material or a ceramic material. Examples of the metal material include an aluminum alloy, a titanium alloy and a nickel alloy. Examples of the ceramic material include a ceramic matrix composite (CMC) such as a SiC/SiC composite (a SiC matrix reinforced with SiC fibers).

Figure 3:
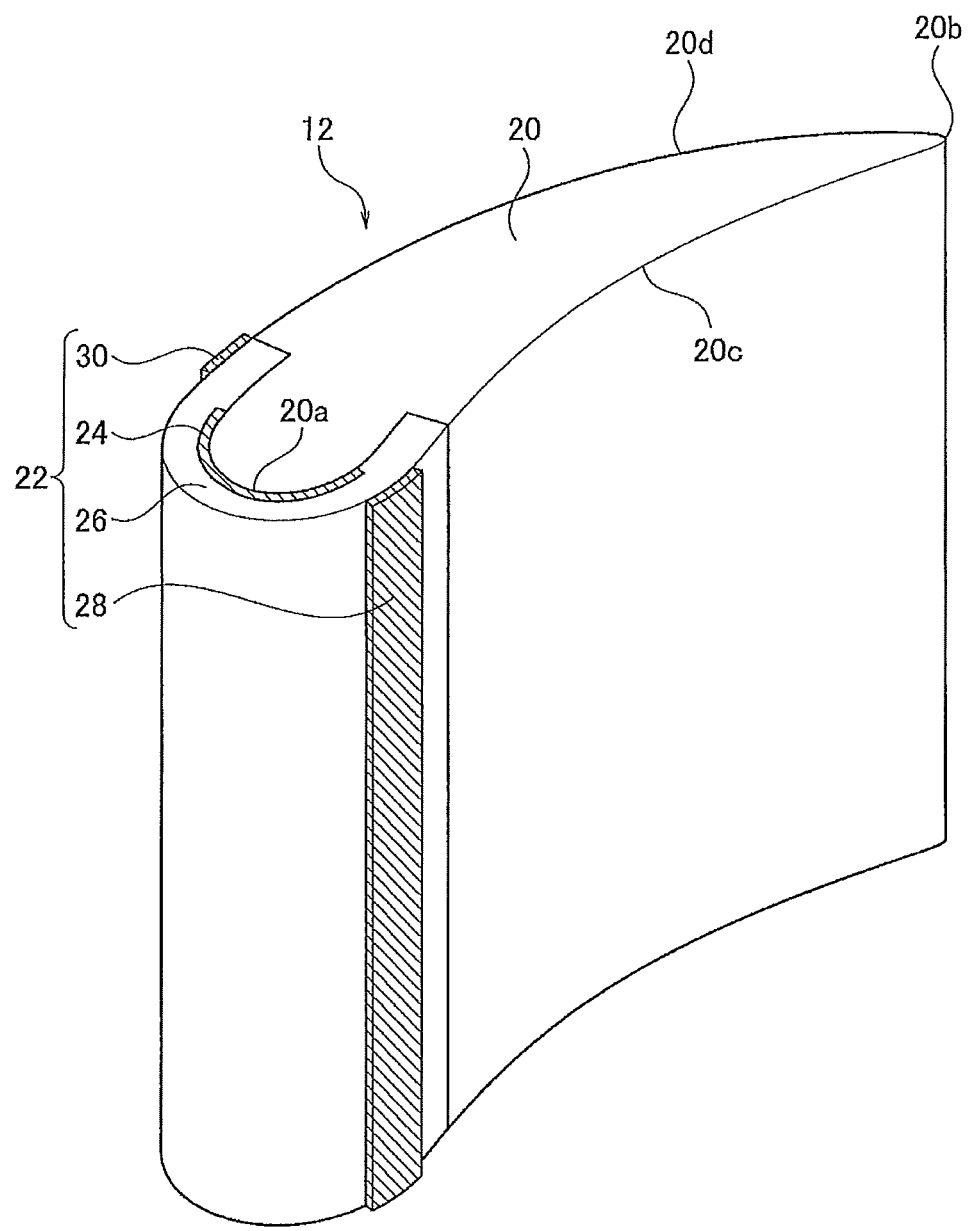
FIG. 3 is a diagram illustrating a configuration of an airfoil in the first embodiment of the present disclosure.

FIG. 3 is a diagram illustrating a configuration of one of the airfoil 12. The airfoil 12 includes an airfoil body 20, and an airflow generator 22 provided to the airfoil body 20. The airfoil 12 has the airfoil body 20 formed extending in the longitudinal direction of the airfoil 12 (the radial direction of the jet engine 8). The airfoil body 20 includes a leading edge 20a located on the upstream side of the working fluid, a trailing edge 20b located on the downstream side of the working fluid, a positive pressure surface 20c formed in the shape of a curved-inward surface, and a negative pressure surface 20*d* formed in the shape of a curved-outward surface. The positive pressure surface 20*c* and the negative pressure surface 20*d* are located between the leading edge 20*a* and trailing edge 20*b*. The airfoil lateral surface of the airfoil body 20 is formed in the three-dimensional curved surface.

The airflow generator 22 is provided to the airfoil body 20, and has a function of producing induced airflow by generating plasma. The airflow generator 22 includes a first electrode 24, a dielectric layer 26, a second electrode 28 and a third electrode 30. The airflow generator 22 has a function as a plasma actuator that produces the airflow induced by dielectric barrier discharge.

The first electrode 24 is provided to the airfoil body 20, and is formed on a leading edge 20*a*-side part of the airfoil lateral surface of the airfoil body 20. The first electrode 24 is provided on the airfoil body 20, for example, spanning from a leading edge 20*a*-side part of the positive pressure surface 20*c* to a leading edge 20*a*-side part of the negative pressure surface 20*d*, and is formed extending in the longitudinal direction from a leading edge 20*a*-side part of the upper end of the airfoil body 20 to a leading edge 20*a*-side part of the lower end of the airfoil body 20. The first electrode 24 is embedded and grounded in an airfoil body 20-side part of the dielectric layer 26. The first electrode 24 is made from a metal, etc. conductive material, such as an aluminum alloy, a titanium alloy and a nickel alloy. The thickness of the first electrode 24 is, for example, approximately 1 µm.

The dielectric layer 26 is provided on the airfoil body 20, and is formed from a ceramic film that is made from ceramic powder to cover the first electrode 24 through room temperature impact consolidation. The dielectric layer 26 is provided on a leading edge 20*a*-side part of the airfoil lateral surface of the airfoil body 20. The dielectric layer 26 is provided on the airfoil body 20, for example, spanning from a leading edge 20*a*-side part of the positive pressure surface 20*c* to a leading edge 20*a*-side part of the negative pressure surface 20*d*, and is formed extending in the longitudinal direction from a leading edge 20*a*-side part of the upper end of the airfoil body 20 to a leading edge 20*a*-side part of the lower end of the airfoil body 20. The outer surface of the dielectric layer 26 may be from a surface that is continuously formed with the positive pressure surface 20*c* and the negative pressure surface 20*d* of the airfoil body 20 in order to enhance the aerodynamic characteristics.

The dielectric layer 26 is formed from the ceramic film that is made from the ceramic powder through room temperature impact consolidation. This ceramic film is a densified ceramic film that is made by crushing and deforming ceramic powder with impact at room temperature. The heat resistance (temperature durability) and dielectric strength (insulation durability) of the dielectric layer 26 can be enhanced by making the dielectric layer 26 from this ceramic film. An yttria ($Y_2O_3$) film, an alumina ($Al_2O_3$) film, or the like is applicable to the ceramic film.

The dielectric layer 26 is formed with a thickness that gives the dielectric layer 26 a dielectric strength against a voltage needed to be applied to the dielectric layer 26 for the plasma generation. The thickness of the dielectric layer 26 is, for example, at approximately 100 µm in a case where the applied voltage is at 10 kVppAC. Incidentally, if the dielectric layer 26 were made from a ceramic bulk body of alumina or the like, the thickness of the dielectric layer 26 would need to be at approximately 1 mm. In contrast, the density of the ceramic film made from the ceramic powder through room temperature impact consolidation makes it possible to decrease the thickness of the dielectric layer 26.

The second electrode 28 is provided on a surface of the dielectric layer 26 in a way that exposes the second layer 28 to the outside. The second electrode 28 is electrically connected to the first electrode 24. An alternating-current voltage is applied to the second electrode 28. The second electrode 28 is provided on a surface of the dielectric layer 26, which is opposite from the airfoil body 20, in the way that exposes the second electrode 28 to the outside, and is formed on the outer surface of the dielectric layer 26 in the way that exposes the second electrode 28 to the outside. The second electrode 28 is, for example, provided to a positive pressure surface 20*c*-side part of the dielectric layer 26, and is formed extending in the longitudinal direction from the upper end of the dielectric layer 26 to the lower end of the dielectric layer 26. For the purpose of enhancing the aerodynamic characteristics, the second electrode 28 may be embedded in the dielectric layer 26 with its surface exposed to the outside. The second electrode 28 is made from the same conductive material as the first electrode 24. The thickness of the second electrode 28 is, for example, at approximately 1 µm. The second electrode 28 and the first electrode 24 are electrically connected together via an alternating-current power supply (not illustrated) using a cable or the like. The application of the alternating-current voltage to the second electrode 28 makes it possible to generate plasma, and thereby to produce the induced airflow.

The third electrode 30 is provided on a surface of the dielectric layer 26 in a way that exposes the third electrode 30 to the outside. The third electrode 30 is formed away from the second electrode 28, and is electrically connected to the first electrode 24. A direct-current voltage is applied to the third electrode 30. The third electrode 30 is provided to a surface of the dielectric layer 26, which is opposite from the airfoil body 20, in the way that exposes the third electrode 30 to the outside, and is formed on the outer surface of the dielectric layer 26 in the way that exposes the third electrode 30 to the outside. The third electrode 30 is, for example, provided to a negative pressure surface 20*d*-side part of the dielectric layer 26, and is formed extending in the longitudinal direction from the upper end of the dielectric layer 26 to the lower end of the dielectric layer 26. For the purpose of enhancing the aerodynamic characteristics, the third electrode 30 may be embedded in the dielectric layer 26 with its surface exposed to the outside. The third electrode 30 is made from the same conductive material as the first electrode 24. The thickness of the third electrode 30 is, for example, at approximately 1 µm. The third electrode 30 and the first electrode 24 are electrically connected together via a direct-current power supply (not illustrated) using a cable or the like. The application of the direct-current voltage to the third electrode 30 makes it possible to change the size and direction of the induced airflow produced by the plasma. Positive and negative direct-current voltages can be applied to the third electrode 30.

Figure 4:
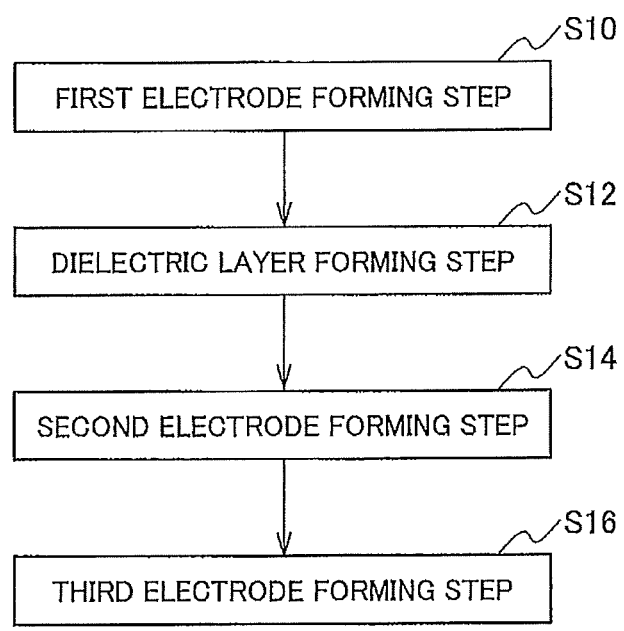
FIG. 4 is a flowchart illustrating an airflow generator forming process in an airfoil structure manufacturing method in the first embodiment of the present disclosure.

Descriptions will be hereinbelow provided for a method of manufacturing the airfoil structure 10. The method of manufacturing the airfoil structure 10 includes a process of forming the airflow generator 22. FIG. 4 is a flowchart illustrating the process of forming the airflow generator 22 in the method of manufacturing the airfoil structure 10. The process of forming the airflow generator 22 includes a first electrode forming step (S10), a dielectric layer forming step (S12), a second electrode forming step (S14), and a third electrode forming step (S16).

The first electrode forming step (S10) is a step of forming the first electrode 24 on the airfoil body 20. The first electrode 24 is formed on the leading edge 20a-side part of the airfoil lateral surface of the airfoil body 20. The first electrode 24 can be formed by depositing the conductive material using a physical vapor deposition method (PVD method) such as sputtering, an aerosol deposition method (described later), or the like. In a case where the airfoil body 20 is made from a metal, etc. conductive material, an insulating layer (not illustrated) made from a ceramic such as alumina may be provided between the airfoil body 20 and the first electrode 24 for the purpose of securing the insulation in between. The insulating layer (not illustrated) can be formed using the same deposition method as the first electrode 24.

The dielectric layer forming step (S12) is a step of forming the dielectric layer 26 on the airfoil body 20 by forming the ceramic powder into the film to cover the first electrode through room temperature impact consolidation. The dielectric layer 26 is formed on the leading edge 20a-side part of the airfoil lateral surface of the airfoil body 20. The dielectric layer 26 can be formed using a deposition method such as an aerosol deposition method or an aerosol gas deposition method in which the powder of yttria ($Y_2O_3$) ceramic, alumina ($Al_2O_3$) ceramic or the like is aerosolized and made into a film through a room temperature impact consolidation phenomenon.

The aerosol deposition method is, for example, a method of forming a coating film on a substrate by injecting an aerosol mixture of material powder and gas onto the substrate at high velocity in a reduced-pressure atmosphere at room temperature (for example, 10° C. to 30° C.). This coating film is made dense by the room temperature impact consolidation phenomenon. The pressure for the film deposition is, for example, in a range of 5 kPa to 50 kPa. The average particle diameter of the material powder is, for example, in a range of 0.1 μm to 1 μm. As the film forming apparatus using the aerosol deposition method, a publicly-known apparatus may be used which includes a chamber in which the coating film is formed on the substrate, an air exhausting pump for exhausting air from the inside of the chamber, an aerosol supplier for supplying the aerosol mixture of the material powder and the gas, and a nozzle for injecting the aerosol. The size of the chamber is, for example, approximately 50 cm in length, approximately 50 cm in width and approximately 50 cm in height.

Such a film forming method as the aerosol deposition method makes it possible to form a denser coating film than the thermal spraying method, and to form the dense coating film with a higher deposition rate than the physical vapor deposition method (PVD method) such as sputtering. If a ceramic bulk body were applied to the airfoil surface, the hardness of the bulk body would make it difficult to process the bulk body into the shape of a three-dimensional curved surface. In contrast, such a film forming method as the aerosol deposition method and the like can easily form the ceramic film even on the airfoil surface having the shape of the three-dimensional curved surface. Furthermore, since the dielectric layer 26 is formed from the ceramic film that is made from the ceramic powder through room temperature impact consolidation, the dielectric layer 26 can be easily repaired using the aerosol deposition method or the like even in a case where the ceramic film wears while the jet engine is in operation, unlike a dielectric layer formed from a resin film or the like.

The second electrode forming step (S14) is a step of forming the second electrode 28 on the surface of the dielectric layer 26 in the way that exposes the second electrode 28 to the outside, such that the second electrode 28 is electrically connected to the first electrode 24, and the alternating-current voltage is applied to the second electrode 28. The second electrode 28 is formed on the surface of the dielectric layer 26, which is opposite from the airfoil body 20, in the way that exposes the second electrode 28 to the outside. The second electrode 28 can be formed by depositing the conductive material using the same film forming method as the first electrode 24.

The third electrode forming step (S16) is a step of forming the third electrode 30 on the surface of the dielectric layer 26 in the way that exposes the third electrode 30 to the outside, such that the third electrode 30 is away from the second electrode 28, the third electrode 30 is electrically connected to the first electrode 24, and the direct-current voltage is applied to the third electrode 30. The third electrode 30 is formed on the surface of the dielectric layer 26, which is opposite from the airfoil body 20, in the way that exposes the third electrode 30 to the outside. The third electrode 30 can be formed by depositing the conductive material using the same film forming method as the first electrode 24.

It should be noted that the airfoil body 20 can be formed employing a generally-used method of forming a compressor airfoil for the compressor in the jet engine, a generally-used method of forming a turbine airfoil for the turbine in the jet engine, the support body 14a can be formed employing a generally-used method of forming a disk for the compressor, the turbine in the jet engine, and the case body 16a can be formed employing a generally-use method of forming a case for the compressor and the turbine in the jet engine. In a case where the airfoil body 20 is formed from a metal material, directional solidification casting or single crystal casting may be employed. Furthermore, in the case where these components are made from a ceramic matrix composite (CMC), the corresponding ceramic may be obtained by forming a preform from ceramic fibers, impregnating the preform with a matrix polymer, and thereafter firing the resultant preform. The matrix may be formed by chemical vapor infiltration, solid phase infiltration or the like.

Descriptions will be hereinbelow provided for how the airflow generator 22 works. When the alternating-current power supply (not illustrated) applies the high-frequency high-voltage alternating-current voltage (for example, approximately 10 kVpp and 10 kHz) to the dielectric layer 26 via the first electrode 24 and the second electrode 28, the electrical discharges take place to generate the plasma. Thereby, the induced airflow in the shape of a jet is produced from the second electrode 28 toward the first electrode 24. Furthermore, the size and direction of the induced airflow can be changed by applying the direct-current voltage to the third electrode 30 from the direct-current power supply (not illustrated). The producing of the induced airflow on the leading edge 20a-side part of the airfoil 12 like this makes it possible to inhibit airflow separation from the airfoil surface.

It should be noted that the airflow generator 22 may be formed from the first electrode 24, the dielectric layer 26 and the second electrode 28, but without the third electrode 30. This exclusion of the third electrode 30 makes it easier to form the airflow generator 22.

In short, since the above-discussed configuration includes the airflow generator on the leading edge-side part of the airfoil, the configuration can produce the induced airflow on the leading edge-side part of the airfoil, and can accordingly enhance the aerodynamic characteristics by inhibiting the airflow separation from the airfoil surface.

Since the above-discussed configuration allows the dielectric layer to be formed on the airfoil body by forming the ceramic powder into the film through room temperature impact consolidation, the configuration makes it possible to easily form the dielectric layer corresponding to the complicated three-dimensional airfoil shape.

Second Embodiment

Figure 5:
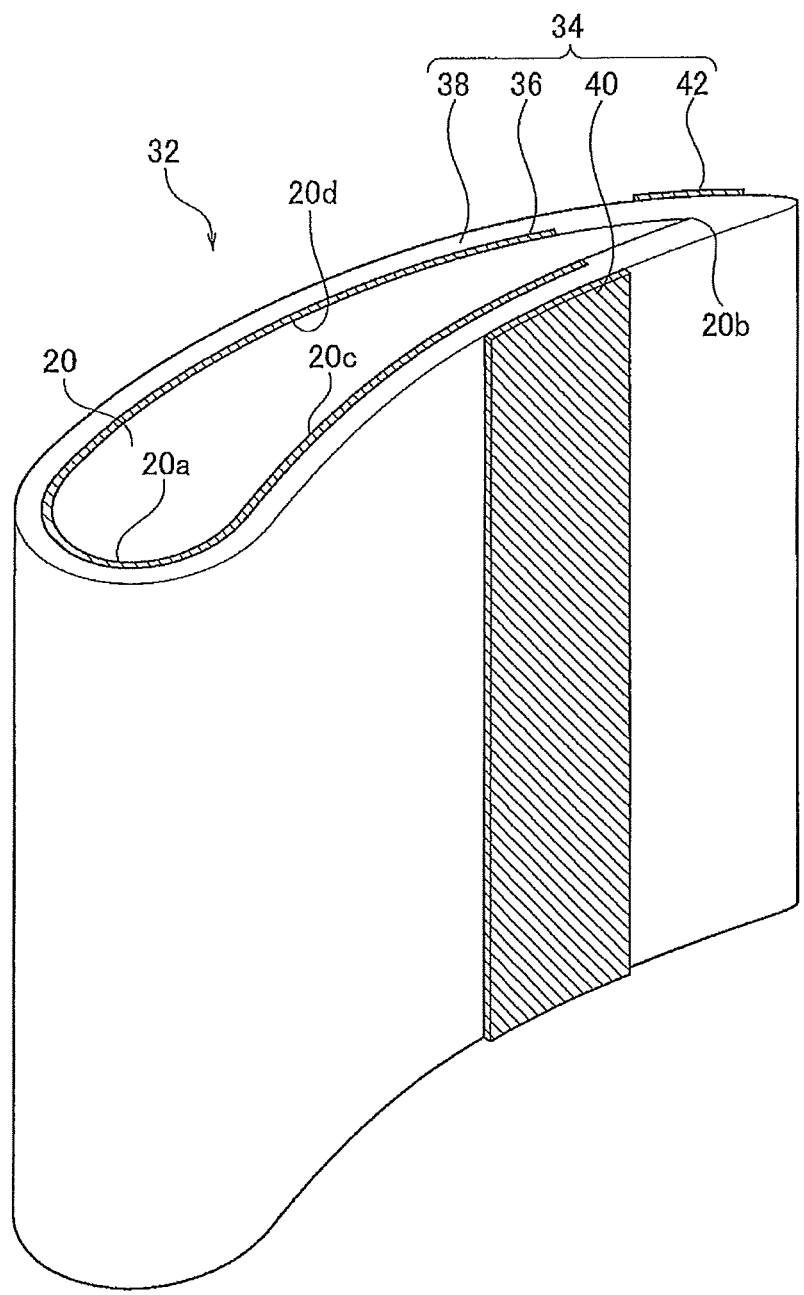
FIG. 5 is a diagram illustrating a configuration of an airfoil in a second embodiment of the present disclosure.

A second embodiment of the present disclosure will be described in detail using the drawing. The second embodiment of the present disclosure is different from the first embodiment in terms of the configuration of the airflow generator. FIG. 5 is a diagram illustrating the configuration of an airfoil 32. Incidentally, the same components will be denoted by the same reference signs, and detailed descriptions for such components will be omitted. The airfoil 32 includes the airfoil body 20, and an airflow generator 34 provided to the airfoil body 20.

The airflow generator 34 is provided to the airfoil body 20, and has a function of producing induced airflow by generating plasma. The airflow generator 34 includes a first electrode 36, a dielectric layer 38, a second electrode 40 and a third electrode 42.

The first electrode 36 is provided on the airfoil body 20, and is formed on the airfoil body 20, spanning from a trailing edge 20b-side part of the negative pressure surface 20d to a trailing edge 20b-side part of the positive pressure surface 20c via the leading edge 20a. The first electrode 36 is formed extending in the longitudinal direction from the upper end of the airfoil body 20 to the lower end of the airfoil body 20. The first electrode 36 is embedded and grounded in an airfoil body 20-side part of the dielectric layer 38.

The dielectric layer 38 is provided on the airfoil body 20, and is formed from a ceramic film that is made from the ceramic powder to cover the first electrode 36 through room temperature impact consolidation. The dielectric layer 38 is provided on the entirety of the airfoil lateral surface of the airfoil body 20, and is formed on all the airfoil lateral surface of the airfoil body 20.

The second electrode 40 is provided on a surface of the dielectric layer 38 in a way that exposes the second layer 40 to the outside, and is formed on a surface of the dielectric layer 38, which is opposite from the airfoil body 20, in the way that exposes the second layer 40 to the outside. The second electrode 40 is electrically connected to the first electrode 36. An alternating-current voltage is applied to the second electrode 40. The second electrode 40 is provided on the outer surface of the dielectric layer 38 in the way that exposes the second electrode 40 to the outside. The second electrode 40 is, for example, provided to a positive pressure surface 20c-side part of the dielectric layer 38 in the trailing edge 20b, and is formed extending in the longitudinal direction from the upper end of the dielectric layer 38 to the lower end of the dielectric layer 38. The second electrode 40 and the first electrode 36 are electrically connected together via an alternating-current power supply (not illustrated) using a cable or the like. The application of the alternating-current voltage to the second electrode 40 makes it possible to generate the plasma, and thereby to produce the induced airflow.

The third electrode 42 is provided on a surface of the dielectric layer 38, which is opposite from the airfoil body 20, in a way that exposes the third electrode 42 to the outside. The third electrode 42 is formed away from the second electrode 40, and is electrically connected to the first electrode 36. A direct-current voltage is applied to the third electrode 42. The third electrode 42 is provided to the outer surface of the dielectric layer 38 in the way that exposes the third electrode 42 to the outside. The third electrode 42 is, for example, provided to a negative pressure surface 20d-side part of the dielectric layer 38 in the trailing edge 20b, and is formed extending in the longitudinal direction from the upper end of the dielectric layer 38 to the lower end of the dielectric layer 38. The third electrode 42 and the first electrode 36 are electrically connected together via a direct-current power supply (not illustrated) using a cable or the like. The application of the direct-current voltage to the third electrode 42 makes it possible to change the size and direction of the induced airflow produced by the plasma. Positive and negative direct-current voltages can be applied to the third electrode 42.

Descriptions will be hereinbelow provided for a process of forming the airflow generator 34 in the airfoil structure manufacturing method in the second embodiment. In the first electrode forming step, the first electrode 36 is formed on the airfoil lateral surface of the airfoil body 20, spanning from the trailing edge 26b-side part of the negative pressure surface 20d to the trailing edge 20b-side part of the positive pressure surface 20c via the leading edge 20a. In the dielectric layer forming step, the dielectric layer 38 is formed on all the airfoil lateral surface of the airfoil body 20 by forming the ceramic powder into the film to cover the first electrode 36 through room temperature impact consolidation. In the second electrode forming step, the second electrode 40 is formed on the surface of the dielectric layer 38, which is opposite from the airfoil body 20, in the way that exposes the second electrode 40 to the outside. In the third electrode forming step, the third electrode 42 is formed on the surface of the dielectric layer 38 in the way that exposes the third electrode 42 to the outside, such that the third electrode 42 is away from the second electrode 40, the third electrode 42 is electrically connected to the first electrode 36, and the direct-current voltage is applied to the third electrode 42. Incidentally, the materials, thicknesses and film forming methods of the first electrode 36, the dielectric layer 38, the second electrode 40 and the third electrode 42 are the same as the configuration of the first embodiment, and detailed descriptions for them will be omitted.

Descriptions will be hereinbelow provided for how the airflow generator 34 works. When the alternating-current power supply (not illustrated) applies the high-frequency high-voltage alternating-current voltage (for example, approximately 10 kVpp and 10 kHz) to the dielectric layer 38 via the first electrode 36 and the second electrode 40, the electrical discharges take place to generate the plasma. Thereby, the induced airflow in the shape of a jet is produced from the second electrode 40 toward the first electrode 36. Furthermore, the size and direction of the induced airflow can be changed by applying the direct-current voltage to the third electrode 42 from the direct-current power supply (not illustrated). The producing of the induced airflow from the leading edge 20a toward the trailing edge 20b of the airfoil 32 like this makes it possible to inhibit airflow separation from the airfoil surface.

It should be noted that the airflow generator 34 may be formed from the first electrode 36, the dielectric layer 38 and the second electrode 40, but without the third electrode 42. This exclusion of the third electrode 42 makes it easier to form the airflow generator 34.

In short, since the above-discussed configuration includes the airflow generator formed on the entirety of the airfoil lateral surface, the configuration can produce the induced airflow from the leading edge toward the trailing edge of the airfoil, and can accordingly enhance the aerodynamic characteristics by inhibiting the airflow separation from the airfoil surface. Furthermore, since the above-discussed configuration allows the dielectric layer to be formed by forming the ceramic powder into the film though room temperature impact consolidation, the configuration brings about the same effects as the configuration of the first embodiment.

Third Embodiment

Figure 6:
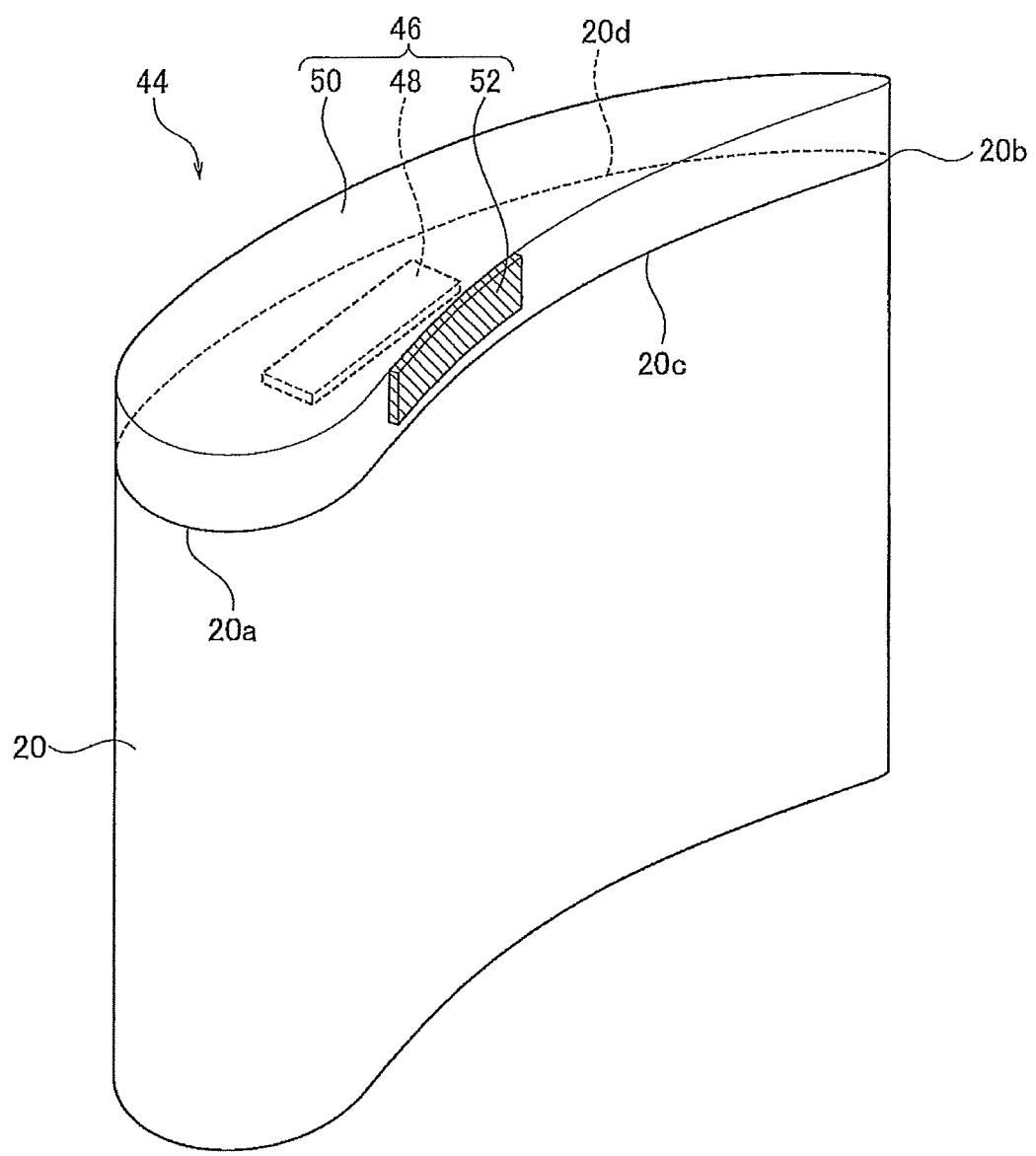
FIG. 6 is a diagram illustrating a configuration of an airfoil in a third embodiment of the present disclosure.

A third embodiment of the present disclosure will be described in detail using the drawing. The third embodiment of the present disclosure is different from the first and second embodiments in terms of the configuration of the airflow generator. FIG. 6 is a diagram illustrating the configuration of an airfoil 44. Incidentally, the same components will be denoted by the same reference signs, and detailed descriptions for such components will be omitted. The airfoil 44 includes the airfoil body 20, and an airflow generator 46 provided to the airfoil body 20.

The airflow generator 46 is provided to the airfoil body 20, and has a function of producing induced airflow by generating plasma. The airflow generator 46 includes a first electrode 48, a dielectric layer 50, and a second electrode 52.

The first electrode 48 is formed on an upper end surface of the airfoil body 20. The first electrode 48 is, for example, formed in a central part of the upper end surface of the airfoil body 20. The first electrode 48 is embedded and grounded in an airfoil body 20-side part of the dielectric layer 50.

The dielectric layer 50 is provided on the upper end surface of the airfoil body 20. The dielectric layer 50 is formed from a ceramic film that is made from the ceramic powder to cover the first electrode 48 through room temperature impact consolidation. The dielectric layer 50 is, for example, formed on all the upper end surface of the airfoil body 20 from the leading edge 20a to the trailing edge 20b.

The second electrode 52 is provided on the side surface of the dielectric layer 50 in a way that exposes the second electrode 52 to the outside. The second electrode 52 is electrically connected to the first electrode 48, and an alternating-current voltage is applied to the second electrode 52. The second electrode 52 is provided on an airfoil lateral surface-side part of the outer surface of the dielectric layer 50. The second electrode 52 is, for example, formed on a positive pressure surface 20c-side part of the dielectric layer 50. The second electrode 52 and the first electrode 48 are electrically connected together via an alternating-current power supply (not illustrated) using a cable or the like. The application of the alternating-current voltage to the second electrode 52 makes it possible to generate the plasma, and thereby to produce the induced airflow.

Descriptions will be hereinbelow provided for a process of forming the airflow generator 46 in the airfoil structure manufacturing method in the third embodiment. In the first electrode forming step, the first electrode 48 is formed on the upper end surface of the airfoil body 20. In the dielectric layer forming step, the dielectric layer 50 is formed on the upper end surface of the airfoil body 20 by forming the ceramic powder into the film to cover the first electrode 48 through room temperature impact consolidation. In the second electrode forming step, the second electrode 52 is formed on the side surface of the dielectric layer 50 in the way that exposes the second electrode 52 to the outside.

Incidentally, the materials, thicknesses and film forming methods of the first electrode 48, the dielectric layer 50 and the second electrode 52 are the same as the configuration of the first embodiment, and detailed descriptions for them will be omitted.

Descriptions will be hereinbelow provided for how the airflow generator 46 works. When the alternating-current power supply (not illustrated) applies the high-frequency high-voltage alternating-current voltage (for example, approximately 10 kVpp and 10 kHz) to the dielectric layer 50 via the first electrode 48 and the second electrode 52, the electrical discharges take place to generate the plasma. Thereby, the induced airflow in the shape of a jet is produced from the second electrode 52 toward the first electrode 48. The producing of the induced airflow on the upper end surface of the airfoil 44 like this makes it possible to inhibit leakage of the working fluid through the clearance between the airfoil 44 and the case 16.

It should be noted that the step of forming the airflow generator 46 may include a third electrode forming step of forming a third electrode (not illustrated) which is formed on the side surface of the dielectric layer 50 in the way that exposes the third electrode to the outside, such that the third electrode (not illustrated) is away from the second electrode 52, the third electrode (not illustrated) is electrically connected to the first electrode 48, and the direct-current voltage is applied to the third electrode (not illustrated). The inclusion of the third electrode (not illustrated) in the airflow generator 46 makes it possible to change the size and direction of the induced airflow produced by the plasma by applying the direct-current voltage to the third electrode (not illustrated) from the direct-current power supply.

In short, since the above-discussed configuration includes the airflow generator on the upper end surface of the airfoil, the configuration can produce the induced airflow on the upper end surface of the airfoil, and can accordingly enhance the aerodynamic characteristics by inhibiting the leakage of the working fluid from the clearance between the airfoil and the case. Furthermore, since the above-discussed configuration allows the dielectric layer to be formed by forming the ceramic powder into the film through room temperature impact consolidation, the configuration brings about the same effects as the configuration of the first embodiment.

Fourth Embodiment

Figure 7:
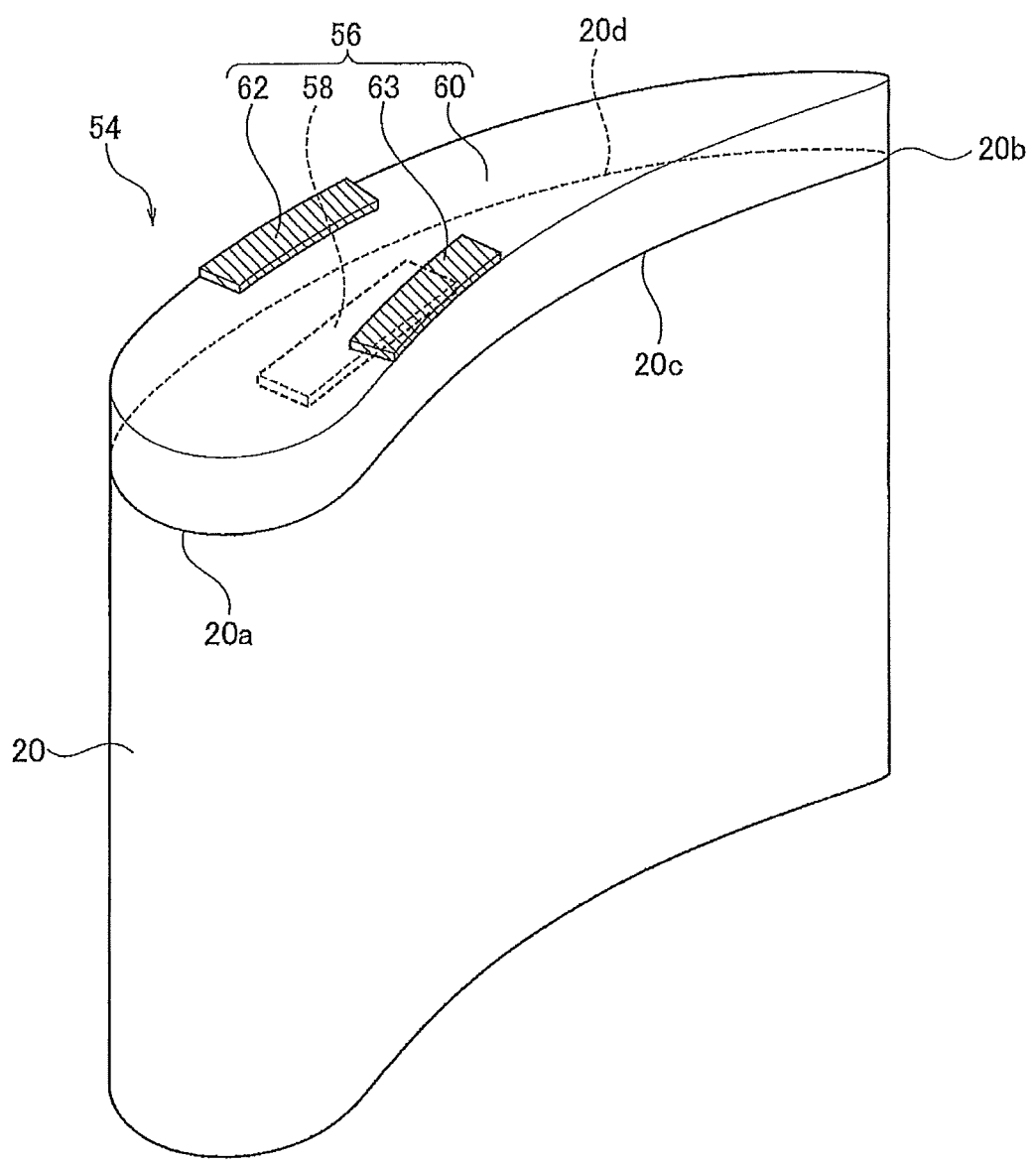
FIG. 7 is a diagram illustrating a configuration of an airfoil in a fourth embodiment of the present disclosure.

A fourth embodiment of the present disclosure will be described in detail using the drawing. The fourth embodiment of the present disclosure is different from the first to third embodiments in terms of the configuration of the airflow generator. FIG. 7 is a diagram illustrating the configuration of an airfoil 54. Incidentally, the same components will be denoted by the same reference signs, and detailed descriptions for such components will be omitted. The airfoil 54 includes the airfoil body 20, and an airflow generator 56 provided to the airfoil body 20.

The airflow generator 56 is provided to the airfoil body 20, and has a function of producing induced airflow by generating plasma. The airflow generator 56 includes a first electrode 58, a dielectric layer 60, a second electrode 62 and a third electrode 63.

The first electrode 58 is formed on an upper end surface of the airfoil body 20. The first electrode 58 is, for example, formed in a central part of the upper end surface of the airfoil body 20. The first electrode 58 is embedded and grounded in an airfoil body 20-side part of the dielectric layer 60.

The dielectric layer 60 is provided on the upper end surface of the airfoil body 20. The dielectric layer 60 is formed from a ceramic film that is made from the ceramic powder to cover the first electrode 58 through room temperature impact consolidation. The dielectric layer 60 is, for example, formed on all the upper end surface of the airfoil body 20 from the leading edge 20a to the trailing edge 20b.

The second electrode 62 is provided on a surface of the dielectric layer 60, which is opposite from the airfoil body 20, in a way that exposes the second electrode 62 to the outside. The second electrode 62 is electrically connected to the first electrode 58, and an alternating-current voltage is applied to the second electrode 62. The second electrode 62 is provided on an outer surface of the dielectric layer 60, which is opposite from the upper end surface of the airfoil body 20, in the way that exposes the second electrode 62 to the outside. The second electrode 62 is, for example, formed on a negative pressure surface 20d-side part of the dielectric layer 60. The second electrode 62 and the first electrode 58 are electrically connected together via an alternating-current power supply (not illustrated) using a cable or the like. The application of the alternating-current voltage to the second electrode 62 makes it possible to generate the plasma, and thereby to produce the induced airflow.

The third electrode 63 is provided on a surface of the dielectric layer 60, which is opposite from the airfoil body 20, in a way that exposes the third electrode 63 to the outside. The third electrode 63 is formed away from the second electrode 62, and is electrically connected to the first electrode 58. A direct-current voltage is applied to the third electrode 63. The third electrode 63 is provided on the outer surface of the dielectric layer 60, which is opposite from the upper end surface of the airfoil body 20, in the way that exposes the third electrode 63 to the outside. The third electrode 63 is, for example, provided to a positive pressure surface 20c-side-part of the dielectric layer 60. The third electrode 63 and the first electrode 58 are electrically connected together via a direct-current power supply (not illustrated) using a cable or the like. The application of the direct-current voltage to the third electrode 63 makes it possible to change the size and direction of the induced airflow produced by the plasma. Positive and negative direct-current voltages can be applied to the third electrode 63.

Descriptions will be hereinbelow provided for a process of forming the airflow generator 56 in the airfoil structure manufacturing method in the fourth embodiment. In the first electrode forming step, the first electrode 58 is formed on the upper end surface of the airfoil body 20. In the dielectric layer forming step, the dielectric layer 60 is formed on the upper end surface of the airfoil body 20 by forming the ceramic powder into the film to cover the first electrode 58 through room temperature impact consolidation. In the second electrode forming step, the second electrode 62 is formed on the surface of the dielectric layer 60, which is opposite from the airfoil body 20, in the way that exposes the second electrode 62 to the outside. In the third electrode forming step, the third electrode 63 is formed on the dielectric layer 60 in the way that exposes the third electrode 63 to the outside, such that the third electrode 63 is away from the second electrode 62, the third electrode 63 is electrically connected to the first electrode 58, and the direct-current voltage is applied to the third electrode 63. Incidentally, the materials, thicknesses and film forming methods of the first electrode 58, the dielectric layer 60, the second electrode 62 and the third electrode 63 are the same as the configuration of the first embodiment, and detailed descriptions for them will be omitted.

Descriptions will be hereinbelow provided for how the airflow generator 56 works. When the alternating-current power supply (not illustrated) applies the high-frequency high-voltage alternating-current voltage (for example, approximately 10 kVpp and 10 kHz) to the dielectric layer 60 via the first electrode 58 and the second electrode 62, the electrical discharges take place to generate the plasma. Thereby, the induced airflow in the shape of a jet is produced from the second electrode 62 toward the first electrode 58. Furthermore, the size and direction of the induced airflow can be changed by applying the direct-current voltage to the third electrode 63 from the direct-current power supply (not illustrated). The producing of the induced airflow on the upper end surface of the airfoil 54 like this makes it possible to inhibit leakage of the working fluid through the clearance between the airfoil 54 and the case 16.

It should be noted that the airflow generator 56 may be formed from the first electrode 58, the dielectric layer 60 and the second electrode 62, but without the third electrode 63. This exclusion of the third electrode 63 makes it easier to form the airflow generator 56.

In short, since the above-discussed configuration includes the airflow generator on the upper end surface of the airfoil, the configuration can produce the induced airflow on the upper end surface of the airfoil, and can accordingly enhance the aerodynamic characteristics by inhibiting the leakage of the working fluid from the clearance between the airfoil and the case. Furthermore, since the above-discussed configuration allows the dielectric layer to be formed by forming the ceramic powder into the film through room temperature impact consolidation, the configuration brings about the same effects as the configuration of the first embodiment.

Fifth Embodiment

Figure 8:
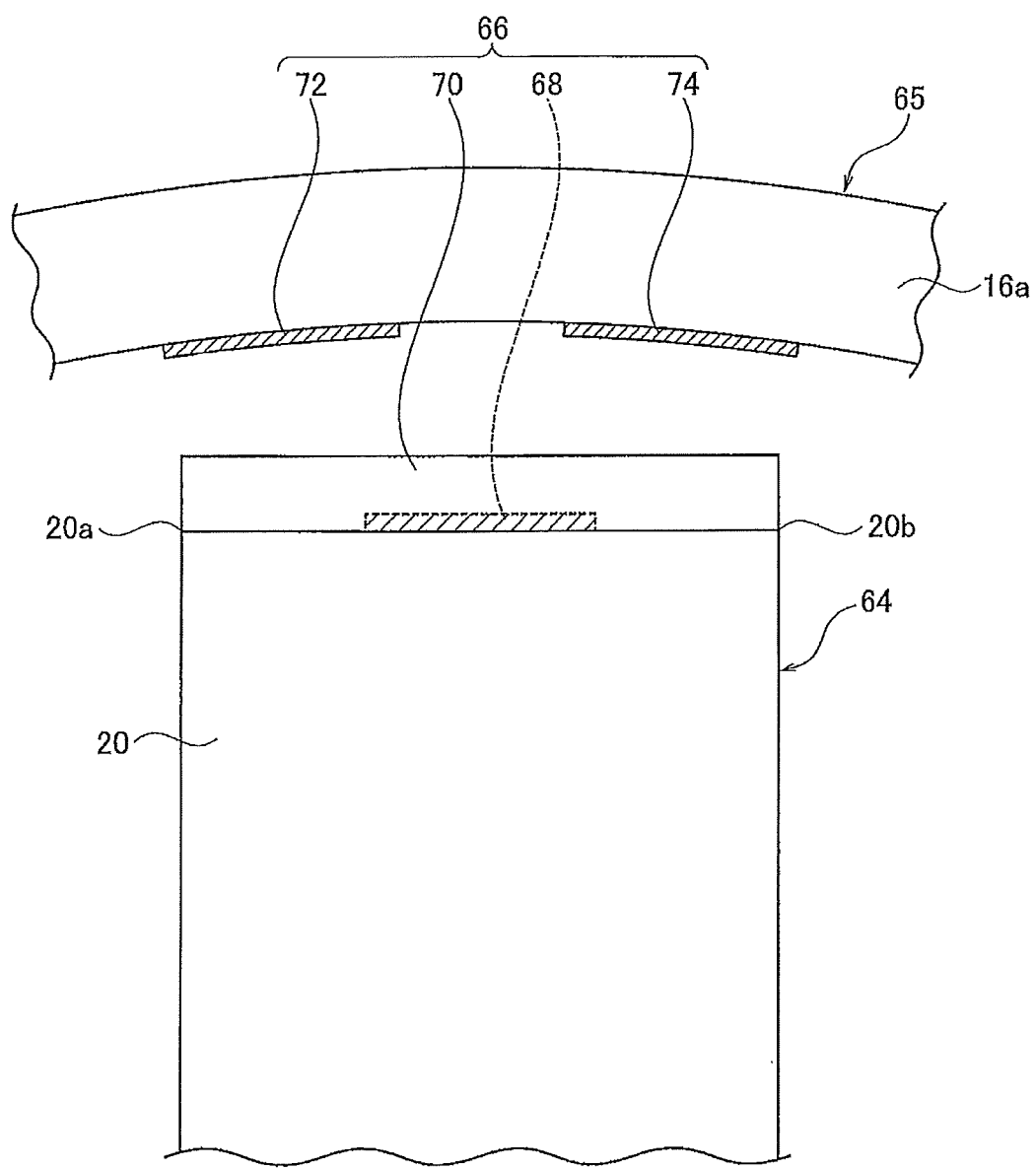
FIG. 8 is a diagram illustrating configurations of an airfoil and a case in a fifth embodiment of the present disclosure.

A fifth embodiment of the present disclosure will be described in detail using the drawing. The fifth embodiment of the present disclosure is different from the first to fourth embodiments in terms of the configuration of the airflow generator. FIG. 8 is a diagram illustrating configurations of an airfoil 64 and a case 65. Incidentally, the same components will be denoted by the same reference signs, and detailed descriptions for such components will be omitted.

The airflow generator 66 is provided to the airfoil body 20 and a case body 16a, and has a function of producing induced airflow by generating plasma. The airflow generator 66 includes a first electrode 68, a dielectric layer 70, a second electrode 72 and a third electrode 74.

The first electrode 68 is formed on an upper end surface of the airfoil body 20. The first electrode 68 is, for example, formed in a central part of the upper end surface of the airfoil body 20. The first electrode 68 is embedded and grounded in a airfoil body 20-side part of the dielectric layer 70.

The dielectric layer 70 is provided on the upper end surface of the airfoil body 20. The dielectric layer 70 is formed from a ceramic film that is made from the ceramic powder to cover the first electrode 68 through room temperature impact consolidation. The dielectric layer 70 is, for example, formed on all the upper end surface of the airfoil body 20 from the leading edge 20a to the trailing edge 20b.

The second electrode 72 is provided on a surface of the case body 16a, which faces the dielectric layer 70, in a way that exposes the second electrode 72 to the outside. The second electrode 72 is electrically connected to the first electrode 68, and an alternating-current voltage is applied to the second electrode 72. The second electrode 72 is, for example, provided on a surface of the case body 16a which faces a leading edge 20a-side part of the dielectric layer 70. The second electrode 72 and the first electrode 68 are electrically connected together via an alternating-current power supply (not illustrated) using a cable or the like. The application of the alternating-current voltage to the second electrode 72 makes it possible to generate the plasma, and thereby to produce the induced airflow.

The third electrode 74 is provided on the surface of the case body 16a, which faces the dielectric layer 70, in a way that exposes the third electrode 74 to the outside. The third electrode 74 is formed away from the second electrode 72. The third electrode 74 is electrically connected to the first electrode 68, and a direct-current voltage is applied to the third electrode 74. The third electrode 74 is, for example, provided on a surface of the case body 16a which faces a trailing edge 20b-side part of the dielectric layer 70. The third electrode 74 and the first electrode 68 are electrically connected together via a direct-current power supply (not illustrated) using a cable or the like. The application of the direct-current voltage to the third electrode 74 makes it possible to change the size and direction of the induced airflow produced by the plasma. Positive and negative direct-current voltages can be applied to the third electrode 74.

Descriptions will be hereinbelow provided for a process of forming the airflow generator 66 in the airfoil structure manufacturing method in the fifth embodiment. In the first electrode forming step, the first electrode 68 is formed on the upper end surface of the airfoil body 20. In the dielectric layer forming step, the dielectric layer 70 is formed on the upper end surface of the airfoil body 20 by forming the ceramic powder into the film to cover the first electrode 68 through room temperature impact consolidation. In the second electrode forming step, the second electrode 72 is formed on the surface of the case body 16a, which faces the dielectric layer 70, in the way that exposes the second electrode 72 to the outside, such that the second electrode 72 is electrically connected to the first electrode 68, and the alternating-current voltage is applied to the second electrode 72. In the third electrode forming step, the third electrode 74 is formed on the surface of the case body 16a, which faces the dielectric layer 70, in the way that exposes the third electrode 74 to the outside, such that the third electrode 74 is away from the second electrode 72, the third electrode 74 is electrically connected to the first electrode 68, and the direct-current voltage is applied to the third electrode 74. Incidentally, the materials, thicknesses and film forming methods of the first electrode 68, the dielectric layer 70, the second electrode 72 and the third electrode 74 are the same as the configuration of the first embodiment, and detailed descriptions for them will be omitted.

Descriptions will be hereinbelow provided for how the airflow generator 66 works. When the alternating-current power supply (not illustrated) applies the high-frequency high-voltage alternating-current voltage (for example, approximately 10 kVpp and 10 kHz) to the dielectric layer 70 via the first electrode 68 and the second electrode 72, the electrical discharges take place to generate the plasma. Thereby, the induced airflow in the shape of a jet is produced from the second electrode 72 toward the first electrode 68. Furthermore, the size and direction of the induced airflow can be changed by applying the direct-current voltage to the third electrode 74 from the direct-current power supply (not illustrated). The producing of the induced airflow on the upper end surface of the airfoil 64 like this makes it possible to inhibit leakage of the working fluid through the clearance between the airfoil 64 and the case 65.

It should be noted that the airflow generator 66 may be formed from the first electrode 68, the dielectric layer 70 and the second electrode 72, but without the third electrode 74. This exclusion of the third electrode 74 makes it easier to form the airflow generator 66.

In short, since the above-discussed configuration includes the airflow generator on the airfoil and the case, the configuration can produce the induced airflow on the upper end surface of the airfoil, and can accordingly enhance the aerodynamic characteristics by inhibiting the leakage of the working fluid from the clearance between the airfoil and the case. Furthermore, since the above-discussed configuration allows the dielectric layer to be formed by forming the ceramic powder into the film through room temperature impact consolidation, the configuration brings about the same effects as the configuration of the first embodiment.

Sixth Embodiment

Figure 9:
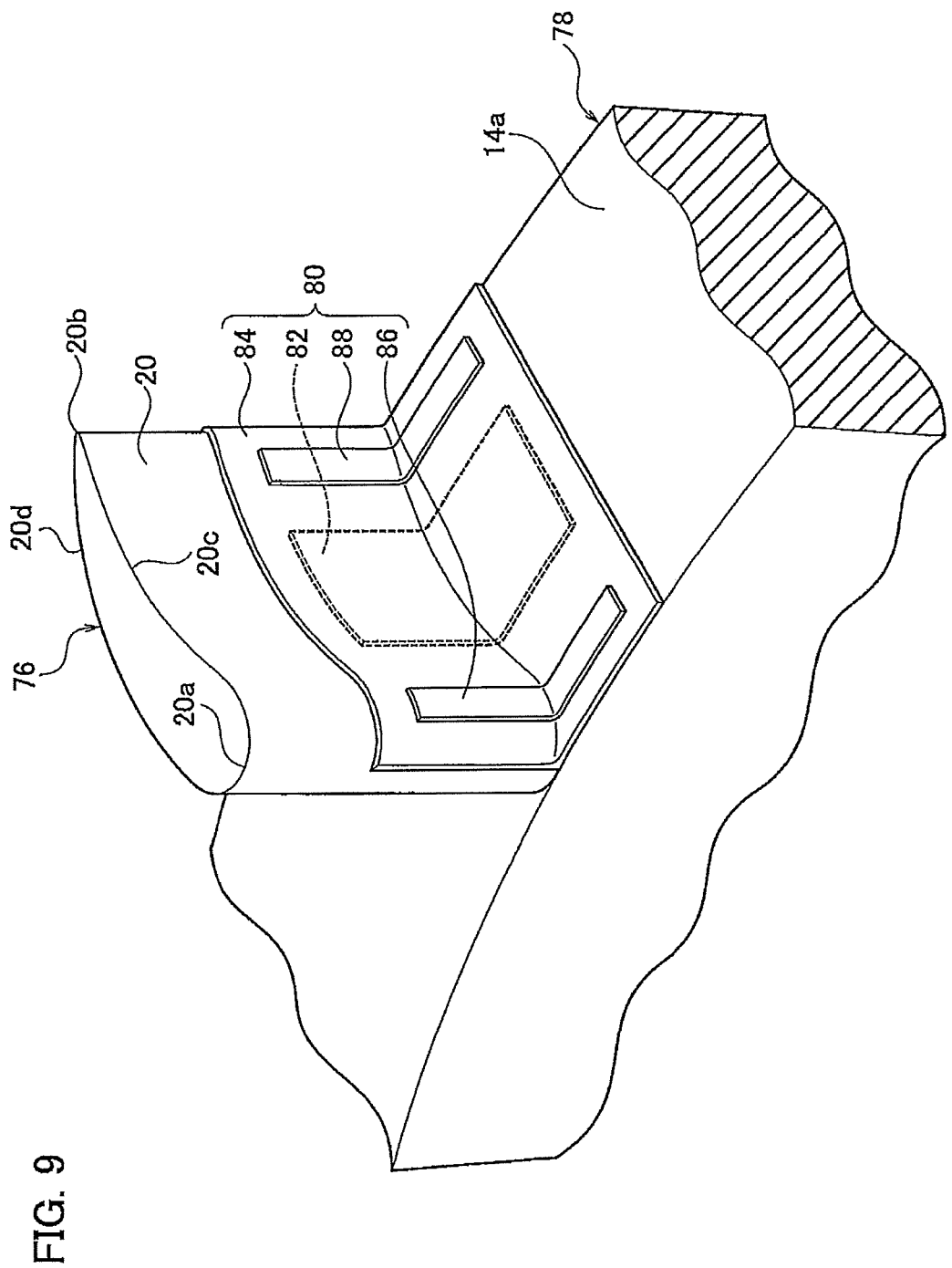
FIG. 9 is a diagram illustrating configurations of an airfoil and a support in a sixth embodiment of the present disclosure.

A sixth embodiment of the present disclosure will be described in detail using the drawing. The sixth embodiment of the present disclosure is different from the first to fifth embodiments in terms of the configuration of the airflow generator. FIG. 9 is a diagram illustrating configurations of an airfoil 76 and a support 78.

The airflow generator 80 is provided to the airfoil body 20 and a support body 14a, and has a function of producing induced airflow by generating plasma. The airflow generator 80 includes a first electrode 82, a dielectric layer 84, a second electrode 86 and a third electrode 88.

The first electrode 82 is provided spanning from the airfoil lateral surface of the airfoil body 20 to an airfoil-side part of the surface of the support body 14a. The first electrode 82 is embedded and grounded in an airfoil body 20-side part and a support body 14a-side part of the dielectric layer 84. The first electrode 82 is, for example, formed in the middle between the leading edge 20a and the trailing edge 20b.

The dielectric layer 84 is provided spanning from the airfoil lateral surface of the airfoil body 20 to the airfoil-side part of the surface of the support body 14a. The dielectric layer 84 is formed from a ceramic film that is made from the ceramic powder to cover the first electrode 82 through room temperature impact consolidation. The dielectric layer 84 is, for example, provided on a positive pressure surface 20c-side part of the airfoil body 20.

The second electrode 86 is provided on a surface of the dielectric layer 84, which is opposite from the airfoil body 20 and the support body 14a, in a way that exposes the second electrode 86 to the outside. The second electrode 86 is electrically connected to the first electrode 82, and an alternating-current voltage is applied to the second electrode 86. The second electrode 86 is formed on the outer surface of the dielectric layer 84. The second electrode 86 is, for example, provided on a leading edge 20a-side part of the dielectric layer 84. The second electrode 86 and the first electrode 82 are electrically connected together via an alternating-current power supply (not illustrated) using a cable or the like. The application of an alternating-current voltage to the second electrode 86 makes it possible to generate the plasma, and thereby to produce the induced airflow.

The third electrode 88 is provided on the surface of the dielectric layer 84, which is opposite from the airfoil body 20 and the support body 14a, in a way that exposes the third electrode 88 to the outside. The third electrode 88 is formed away from the second electrode 86. The third electrode 88 is electrically connected to the first electrode 82, and a direct-current voltage is applied to the third electrode 88. The third electrode 88 is provided on the outer surface of the dielectric layer 84. The third electrode 88 is, for example, provided a trailing edge 20b-side part of the dielectric layer 84. The third electrode 88 and the first electrode 82 are electrically connected together via a direct-current power supply (not illustrated) using a cable or the like. The application of the direct-current voltage to the third electrode 88 makes it possible to change the size and direction of the induced airflow produced by the plasma. Positive and negative direct-current voltages can be applied to the third electrode 88.

Descriptions will be hereinbelow provided for a process of forming the airflow generator 80 in the airfoil structure manufacturing method in the sixth embodiment. In the first electrode forming step, the first electrode 82 is formed spanning from the airfoil lateral surface of the airfoil body 20 to the airfoil-side part of the surface of the support body 14a. In the dielectric layer forming step, the dielectric layer 84 is formed spanning from the airfoil lateral surface of the airfoil body 20 to the airfoil-side part of the surface of the support body 14a, by forming the ceramic powder into the film to cover the first electrode 82 through room temperature impact consolidation. In the second electrode forming step, the second electrode 86 is formed on the surface of the dielectric layer 84, which is opposite from the airfoil body 20 and the support body 14a, in the way that exposes the second electrode 86 to the outside, such that the second electrode 86 is electrically connected to the first electrode 82, and the alternating-current voltage is applied to the second electrode 86. In the third electrode forming step, the third electrode 88 is formed on the surface of the dielectric layer 84, which is opposite from the airfoil body 20 and the support body 14a, in the way that exposes the third electrode 88 to the outside, such that the third electrode 88 is away from the second electrode 86, the third electrode 88 is electrically connected to the first electrode 82, and the direct-current voltage is applied to the third electrode 88. Incidentally, the materials, thicknesses and film forming methods of the first electrode 82, the dielectric layer 84, the second electrode 86 and the third electrode 88 are the same as the configuration of the first embodiment, and detailed descriptions for them will be omitted.

Descriptions will be hereinbelow provided for how the airflow generator 80 works. When the alternating-current power supply (not illustrated) applies the high-frequency high-voltage alternating-current voltage (for example, approximately 10 kVpp and 10 kHz) to the dielectric layer 84 via the first electrode 82 and the second electrode 86, the electrical discharges take place to generate the plasma. Thereby, the induced airflow in the shape of a jet is produced from the second electrode 86 toward the first electrode 82. Furthermore, the size and direction of the induced airflow can be changed by applying the direct-current voltage to the third electrode 88 from the direct-current power supply (not illustrated). The producing of the induced airflow around the airfoil 76 and the support 78 like this makes it possible to inhibit a shock wave and a secondary flow.

It should be noted that the airflow generator 80 may be formed from the first electrode 82, the dielectric layer 84 and the second electrode 86, but without the third electrode 88. This exclusion of the third electrode 88 makes it easier to form the airflow generator 80.

In short, since the above-discussed configuration includes the airflow generator spanning from the airfoil and the support, the configuration can produce the induced airflow around the airfoil and the support, and can accordingly enhance the aerodynamic characteristics by inhibiting the shock wave and the secondary flow. Furthermore, since the above-discussed configuration allows the dielectric layer to be formed by forming the ceramic powder into the film through room temperature impact consolidation, the configuration brings about the same effects as the configuration of the first embodiment.

The present disclosure makes it possible to easily form the ceramic-made dielectric layer for producing the airflow on the airfoil body and the like, and is accordingly useful for the compressor, the turbine and the like of the jet engine.

What is claimed is:

1. A method of manufacturing an airfoil structure to be used in a jet engine, the airfoil structure including
   a plurality of airfoils,
   a support for supporting the airfoils at their lower ends, and
   a case for covering upper ends of the airfoils, and
   each airfoil including
      an airfoil body formed extending in a longitudinal direction of the airfoil, and
      an airflow generator, provided to the airfoil body, for producing induced airflow by generating plasma,
   the method comprising a process of forming the airflow generator that includes:
   a first electrode forming step of forming a first electrode on the airfoil body;
   a dielectric layer forming step of forming a dielectric layer on the airfoil body by forming ceramic powder into a film to cover the first electrode through room temperature impact consolidation; and
   a second electrode forming step of forming a second electrode on a surface of the dielectric layer in a way that exposes the second electrode to an outside, such that the second electrode is electrically connected to the first electrode, wherein
   the second electrode is configured to receive alternating-current voltage,
   in the first electrode forming step, the first electrode is formed on an airfoil lateral surface of the airfoil body, the first electrode spanning from a trailing edge-side part of a negative pressure surface to a trailing edge-side part of a positive pressure surface via a leading edge,
   in the dielectric layer forming step, the dielectric layer is formed over an entirety pf the airfoil lateral surface of the airfoil body, and
   in the second electrode forming step, the second electrode is formed on the surface of the dielectric layer, which is opposite from the airfoil body, in the way that exposes the second electrode to the outside.

2. The method of manufacturing an airfoil structure according to claim 1, wherein
   the process of forming the airflow generator further comprises a third electrode forming step of forming a third electrode on the surface of the dielectric layer in a way that exposes the third electrode to the outside, such that the third electrode is away from the second electrode, the third electrode is electrically connected to the first electrode, and the third electrode is configured to receive direct-current voltage.

3. The method of manufacturing an airfoil structure according to claim 1, wherein in the dielectric layer forming step, the dielectric layer is formed using an aerosol deposition method.

4. The method of manufacturing an airfoil structure according to claim 1, wherein a thickness of the dielectric layer is 100 μm.

* * * * *